United States Patent
Bates et al.

(10) Patent No.: US 9,525,746 B2
(45) Date of Patent: *Dec. 20, 2016

(54) MEDIA PLAYLIST CONSTRUCTION FOR VIRTUAL ENVIRONMENTS

(71) Applicant: ACTIVISION PUBLISHING, INC., Santa Monica, CA (US)

(72) Inventors: Cary Lee Bates, Rochester, MN (US); Jim Chun-Ta Chen, Rochester, MN (US); Zachary Adam Garbow, Rochester, MN (US); Gregory Edward Young, South St. Paul, MN (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,525

(22) Filed: Sep. 15, 2014

(65) Prior Publication Data

US 2015/0127818 A1    May 7, 2015

Related U.S. Application Data

(63) Continuation of application No. 13/021,847, filed on Feb. 7, 2011, now Pat. No. 8,838,640, which is a continuation of application No. 11/964,312, filed on Dec. 26, 2007, now Pat. No. 7,886,045.

(51) Int. Cl.
*H04L 29/08* (2006.01)
*G06F 17/30* (2006.01)

(52) U.S. Cl.
CPC ........ *H04L 67/22* (2013.01); *G06F 17/30749* (2013.01); *G06F 17/30764* (2013.01); *G06F 17/30766* (2013.01); *G06F 17/30772* (2013.01)

(58) Field of Classification Search
None
See application file for complete search history.

(56) References Cited

U.S. PATENT DOCUMENTS

| | | |
|---|---|---|
| 7,460,761 B2 | 12/2008 | Inoue et al. |
| 7,612,275 B2 | 11/2009 | Seppanen et al. |
| 7,886,045 B2 | 2/2011 | Bates et al. |
| 8,838,640 B2 | 9/2014 | Bates et al. |

(Continued)

OTHER PUBLICATIONS

USPTO Office Action History of U.S. Appl. No. 11/964,984, date range: Nov. 10, 2009 to Jan. 26, 2011.

(Continued)

*Primary Examiner* — Hosain Alam
*Assistant Examiner* — Tuan-Khanh Phan
(74) *Attorney, Agent, or Firm* — Novel IP

(57) ABSTRACT

Embodiments of the invention provide techniques for generating song playlists for use in an immersive virtual environment. Generally, playlists may be generated based on stored music preference data. The music preference data may be generated by storing user interactions with specific songs. The user interactions may be associated with characteristics of the user's situational context within the virtual world. The music preference data may be indexed by song name, and/or by musical properties. Subsequently, the music preference data may be used to generate a playlist adapted to the user's current situation within the virtual world.

21 Claims, 4 Drawing Sheets

(56) References Cited

U.S. PATENT DOCUMENTS

| | | |
|---|---|---|
| 2006/0026535 A1* | 2/2006 | Hotelling .............. G06F 3/0418 |
| | | 715/863 |
| 2006/0136173 A1* | 6/2006 | Case ..................... A63B 24/00 |
| | | 702/182 |
| 2007/0025194 A1 | 2/2007 | Morse et al. |
| 2007/0155494 A1* | 7/2007 | Wells et al. ..................... 463/35 |
| 2007/0247979 A1 | 10/2007 | Brillon et al. |
| 2007/0271116 A1 | 11/2007 | Wysocki et al. |
| 2008/0086379 A1 | 4/2008 | Dion et al. |
| 2008/0091717 A1* | 4/2008 | Garbow ............ G06F 17/30749 |
| 2008/0201638 A1 | 8/2008 | Nair |
| 2008/0204448 A1 | 8/2008 | Dawson et al. |
| 2008/0250315 A1 | 10/2008 | Eronen et al. |
| 2009/0037822 A1* | 2/2009 | Kandekar .............. G06Q 10/00 |
| | | 715/733 |
| 2009/0055426 A1 | 2/2009 | Kalasapur et al. |
| 2009/0158161 A1 | 6/2009 | Gibbs et al. |
| 2009/0172146 A1 | 7/2009 | Bates et al. |
| 2009/0172538 A1 | 7/2009 | Bates et al. |
| 2009/0299960 A1* | 12/2009 | Lineberger ........................ 707/3 |
| 2010/0018382 A1 | 1/2010 | Feeney et al. |
| 2010/0050100 A1 | 2/2010 | Dettinger et al. |
| 2011/0131239 A1 | 6/2011 | Bates et al. |

OTHER PUBLICATIONS

USPTO Office Action History of U.S. Appl. No. 11/964,312, date range: Nov. 10, 2009 to Jan. 19, 2011.

U.S. Patent Application entitled "Generating Data for Media Playlist Construction in Virtual Environments", filed Dec. 27, 2007, U.S. Appl. No. 11/964,984.

* cited by examiner

MEDIA PLAYLIST CONSTRUCTION FOR VIRTUAL ENVIRONMENTS

CROSS-REFERENCE TO RELATED APPLICATIONS

This application is a continuation of U.S. patent application Ser. No. 13/021,847, filed Feb. 7, 2011 (which issued as U.S. Pat. No. 8,838,640 on Sep. 16, 2014), which is a continuation of U.S. patent application Ser. No. 11/964,312, filed Dec. 26, 2007 (which issued as U.S. Pat. No. 7,886,045 on Feb. 8, 2011), each of which is hereby incorporated by reference herein in its entirety.

BACKGROUND OF THE INVENTION

1. Field of the Invention

The field of the invention relates to immersive virtual environment presentation, specifically to generating music playlists within an immersive virtual environment.

2. Description of the Related Art

A virtual world is a simulated environment in which users may inhabit and interact with one another via avatars. Users may also interact with virtual objects and locations of the virtual world. An avatar generally provides a graphical representation of an individual within the virtual world environment. Avatars are usually presented to other users as two or three-dimensional graphical representations of humanoids. Frequently, virtual worlds allow for multiple users to enter and interact with one another.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or multi-user environments, the virtual world continues to exist, and plots and events continue to occur as users enter (and exit) the virtual world.

Virtual worlds provide an immersive environment as they typically appear similar to the real world, with real world rules such as gravity, topography, locomotion, real-time actions, and communication. Communication may be in the form of text messages sent between avatars, but may also include real-time voice communication. While interacting with the virtual world, users may be provided with a musical soundtrack. The musical soundtrack may be organized and arranged into playlists of songs.

SUMMARY OF THE INVENTION

One embodiment of the invention includes a method for generating playlists for use in a virtual environment. The method may generally include: monitoring a user interacting with the virtual environment through an avatar; in response to detecting a triggering event, determining one or more characteristics of a situational context of the avatar within the virtual environment; based on the determined one or more characteristics, generating a playlist; and providing the user with one or more songs included in the playlist.

Another embodiment of the invention includes a computer-readable storage medium including a program, which when executed on a processor performs an operation. The operation may generally include: monitoring a user interacting with the virtual environment through an avatar; in response to detecting a triggering event, determining one or more characteristics of a situational context of the avatar within the virtual environment; based on the determined one or more characteristics, generating a playlist; and providing the user with one or more songs included in the playlist.

Another embodiment of the invention includes a system having a database, a processor, and a memory containing a program, which when executed by the processor is configured to generate a playlist for a user of a virtual environment. The program may generally be configured to perform the steps of monitoring a user interacting with the virtual environment through an avatar; in response to detecting a triggering event, determining one or more characteristics of a situational context of the avatar within the virtual environment; based on the determined one or more characteristics, generating a playlist; and providing the user with one or more songs included in the playlist.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
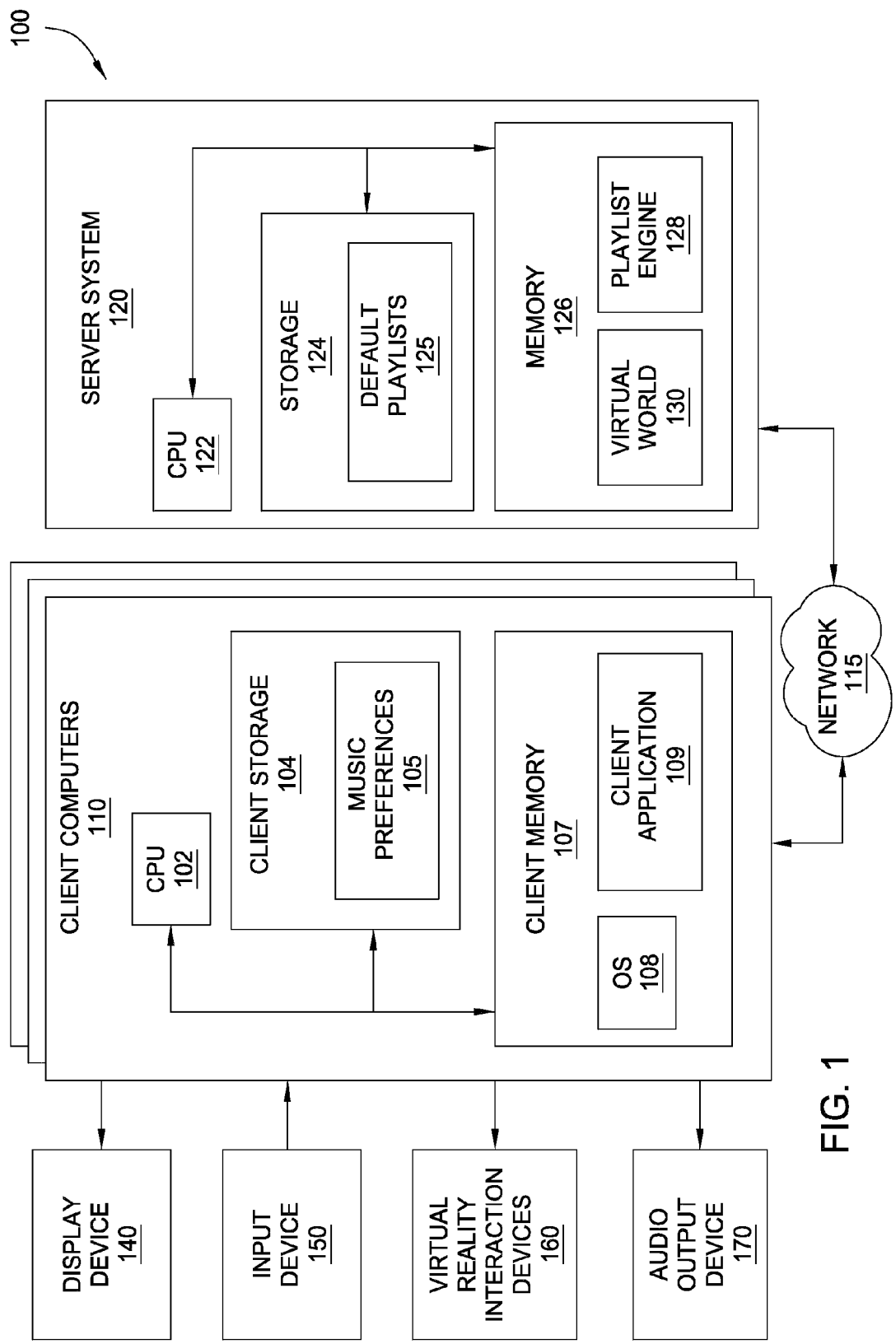
FIG. 1 is a block diagram that illustrates a client server view of an exemplary computing environment, according to one embodiment of the invention.

A virtual world is a simulated environment in which users may be represented by avatars. An avatar may be used by the user to "travel" through locations of the virtual world, such as virtual streets, buildings, rooms, etc. While in the virtual world, the user may be provided with a musical soundtrack, which may be composed of playlists of songs. Each playlist may include songs that are suited to particular moods or actions of the user. For example, a user engaged in a business task within the virtual world may wish to listen to a playlist of subdued and unobtrusive songs. On the other, a user that is participating in a virtual sport may wish to listen to a playlist of lively songs.

However, in order to compose a playlist, a user may have to manually select and arrange multiple songs. This process may be tedious and time-consuming for the user. Once composed, a playlist may be static, meaning the songs included in the playlist will not change, unless the user manually modifies the playlist. Thus, the user may grow tired of listening to the same playlist repeatedly.

Embodiments of the invention provide techniques for generating song playlists for use in an immersive virtual environment. Generally, playlists may be generated based on stored music preference data. The music preference data may be generated by storing user interactions with specific songs. The user interactions may be associated with characteristics of the user's situational context within the virtual world. The music preference data may be indexed by song name, and/or by musical properties. Subsequently, the music preference data may be used to generate a playlist adapted to the user's current situation within the virtual world.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s). Further, this application is related by subject matter to U.S. patent application Ser. No. 11/964,984, filed Dec. 27, 2007, which issued as U.S. Pat. No. 7,890,623 on Feb. 15, 2011, and which is hereby incorporated herein by reference in its entirety.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes client computers 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, each client computer 110 includes a central processing unit (CPU) 102, which obtains instructions and data via a bus 111 from client memory 107 and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. Client computer 110 is operably connected to the network 115.

Client memory 107 includes an operating system (OS) 108 and a client application 109. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, client application 109 provides a software program that allows a user to connect to a virtual world 130, and once connected, to perform various user actions. Such actions may include exploring virtual locations, interacting with other avatars, and interacting with virtual objects. Further, client application 109 may be configured to generate and display a visual representation of the user within the immersive environment, generally referred to as an avatar. The avatar of the user is generally visible to other users in the virtual world, and the user may view avatars representing the other users. Furthermore, the client application 109 may also be configured to generate and display the immersive environment to the user and to transmit the user's desired actions to virtual world 130 on server 120. Such a display may include content from the virtual world determined from the user's line of sight at any given time. For the user, the display may present a third-person perspective, meaning a view from a location other than that of the user's avatar, and which may include the image of the user's avatar within the virtual world. Alternatively, the display may present a first-person perspective, meaning a view of the virtual world as would be seen through the eyes of the avatar representing the user.

Figure 2:
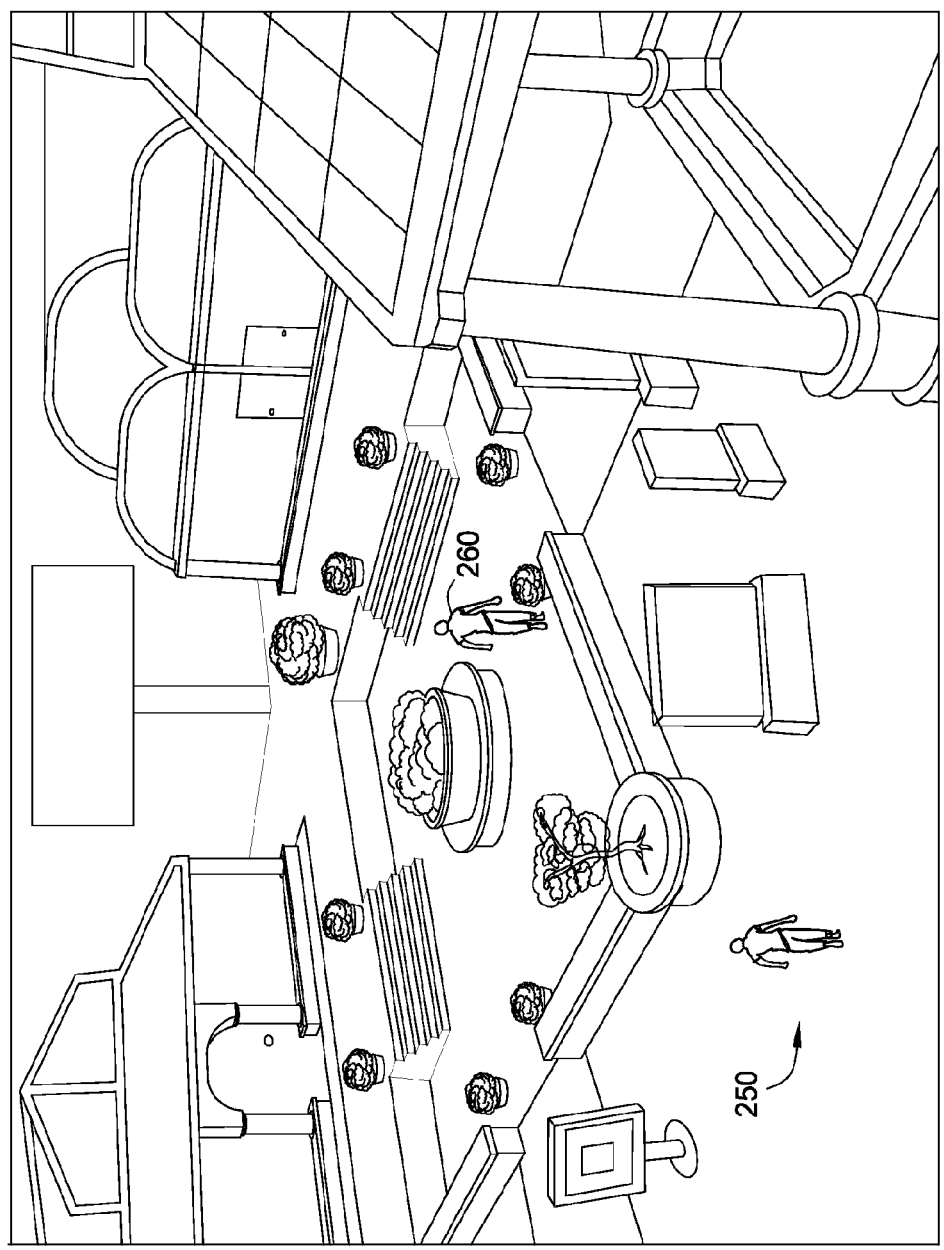
FIG. 2 illustrates a user display for a user participating in a virtual world, according to one embodiment of the invention.

By way of example, FIG. 2 illustrates a user display 200 for a user participating in a virtual world, according to one embodiment of the invention. In particular, FIG. 2 represents a third-person view presented to a user participating in a virtual world. In this example, the user is represented by avatar 250, and is present in a virtual town square. The user may interact with elements of the virtual world, including an avatar 260, which represents another user. For example, the user may control avatar 250 to initiate a contact with avatar 260, thus enabling the user to communicate with the other user.

Returning to FIG. 1, the user may view the virtual world using a display device 140, such as an LCD or CRT monitor display, and interact with the client application 109 using input devices 150. Further, in one embodiment, the user may interact with client application 109 and virtual world 130 using a variety of virtual reality interaction devices 160. For example, the user may don a set of virtual reality goggles that have a screen display for each lens. Furthermore, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment.

In one embodiment, the client application 109 may be further configured to provide a music soundtrack to a user of the virtual world 130. The soundtrack may be played to the user through an audio output device 170, which may represent, e.g., a stereo system, computer speakers, headphones, and the like. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within the virtual world 130.

As shown, client storage 104 may include music preferences 105. In one embodiment, music preferences 105 may represent song preferences of a user of client application 109 on a particular client 110. For example, music preferences 105 may include a history of songs played as a soundtrack during past interactions with the virtual world 130. Further, music preferences 105 may include a user rating for each song, meaning an indication of a degree of preference for the particular song. Music preferences 105 may further describe the user's preferences in terms of musical properties, such as song genres, rhythms, tempos, lyrics, instruments, and the like.

In one embodiment, music preferences 105 may include data that is manually entered and/or edited by the user. For example, the client application 109 may provide the user with a graphical user interface (GUI) for manually editing the music preferences 105. In another embodiment, music preferences 105 may be generated based on user interactions with songs played while the user is in the virtual world 130. That is, as the user interacts with songs played as a soundtrack, the music preferences 105 may be automatically modified according to preferences revealed by the interactions. For example, in response to interactions such as selecting a song, repeating a song, turning up the volume, etc., the client application 109 may modify the music preferences 105 to indicate that the user likes that song. In another example, in response to user interactions such as skipping a song, turning down the volume, etc., the client application 109 may modify the music preferences 105 to indicate that the user dislikes that song.

In one embodiment, music preferences 105 may store data describing user preferences in terms of the user's situational context within the virtual world 130. That is, the music preferences 105 may store associations between song preferences and factors describing the user's situation while in the virtual world 130. One such situational factor may be the user's current activity within the virtual world 130. For example, if a user frequently selects a particular song while playing a virtual sport, the music preferences 105 may be modified to store a positive association between the selected song and the activity of playing the virtual sport. In one embodiment, the modifications of the music preferences 105 may be performed by the client application 109.

Another situational factor may be the user's current companions within the virtual world 130. For example, if the user always skips a certain song while in the company of a particular business associate, the music preferences 105 may be modified to store a negative association between the song and the business associate. In another example, if a particular song was playing during a first meeting between the user and a casual acquaintance, the music preferences 105 may be modified to store a mnemonic relationship between the song and the acquaintance. Thereafter, the song may be played when the user again encounters the acquaintance, thus serving as a reminder of the context of the first meeting between them. Yet another situational factor may be the user's profile, meaning a general description of the primary user's intended activity or mode of interacting while in the virtual world 130. For example, a user engaged in business activities may use an "At Work" profile, and may prefer to listen to jazz while in using that profile. Yet another situational factor may be the user's location within the virtual world 130. For example, a user may prefer to listen to quiet music while visiting a virtual library, but may prefer to listen to fast-paced music while visiting a virtual nightclub.

In one embodiment, the music preferences 105 may store associations between songs and user moods. That is, the user's mood at a given time may be determined, and then may be associated to the user's song preferences, as indicated by contemporaneous user interactions (e.g., playing a song, skipping a song, etc.). The user's mood may be determined by, e.g., searching the user's communications for keywords or phrases that have been predefined as indicating a particular mood. For example, assume that the user states "My friend and I had a fight, and now I am angry." In this situation, the client application 109 may be configured to compare the keywords "fight" and "angry" to predefined associations of keywords and moods, and thus to determine that the user's current mood is one of anger. Alternatively, the user's mood may be determined by other techniques. For example, the user's mood may be determined by measuring physical characteristics of the user that might indicate the user's mood (e.g., heart rate, blood pressure, blink rate, voice pitch and/or volume, etc.), by user interactions (e.g., virtual fighting, virtual gestures, etc.), or by a user setting or command intended to indicate mood.

In one embodiment, server system 120 includes a CPU 122, which obtains instructions and data via a bus 121 from memory 126 and storage 124. The processor 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). In addition, memory 126 and storage 124 may be considered to include memory physically located elsewhere in a server 120, for example, on another computer coupled to the server 120 via bus 121. Server 120 may be operably connected to the network 115, which generally represents any kind of data communications network. Accordingly, the network 115 may represent both local and wide area networks, including the Internet.

Memory 126 includes virtual world 130 and a playlist engine 128. In one embodiment, virtual world 130 may be a software application that allows a user to explore and interact with an immersive environment. The playlist engine 128 may represent a software application configured to generate playlists of songs for use as a soundtrack to accompany the use of the virtual world 130. The generated playlists may be provided to the client application 109, which may then play the songs included in the playlists to the user while in the virtual world 130. In one embodiment, the playlists may consist of lists of song identifiers (e.g., song names). The client application 109 may be configured to retrieve audio content matching the song identifiers included in the playlists. In another embodiment, the playlists may include audio content of songs, which may be played by the client application 109. Such audio content may include, e.g., MP3 files, streaming audio, analog audio, or any other audio data format.

In one embodiment, the playlist engine 128 may be configured to generate playlists based on the music preferences 105 of a given user. That is, the playlist engine 128 may analyze the music preferences 105 stored on the user's client computer 110 in order to generate a playlist that is adapted to the current situational context of the user within the virtual world 130, including the user's activity, profile, location, companions, and the like. For example, in the case of a user that is currently playing a virtual sport, the playlist engine 128 may analyze the music preferences 105 to determine whether the user has a positive association between any songs and the activity of playing the virtual sport. If so, the playlist engine 128 may generate a playlist that includes those songs. The generated playlist may then be provided to the client application 109, and may be played to the user through the audio output device 170. Alternatively, the playlist engine 128 may generate a playlist from songs matching musical properties specified in the music preferences 105. Such musical properties may include, for example, song genres, rhythms, tempos, lyrics, instruments, and the like.

In one embodiment, the playlist engine 128 may be further configured to generate a playlist based on the user's mood or emotional state. More specifically, the playlist engine 128 may be configured to receive an indication of the user's current mood from the client application 109, to compare the user's mood to any associations stored in the music preferences 105, and to generate a playlist that corresponds to the indicated mood. As described above, the client application 109 may determine the user's mood by analyzing keywords or phrases in the user's communications, physical characteristics of the user, user interactions, user commands, and the like. The playlist engine 128 may be further configured to generate playlists for the purpose of trying to change the user's mood. That is, if the user's current mood does not match a target mood, the playlist engine 128 may generate a playlist that includes songs intended to change the user's mood. The target mood may be, e.g., a default setting of the virtual world 130, or a user-configurable system setting in the client application 109. For example, assume the user has configured a system setting to specify a preference for a happy mood. Assume further that the client application 109 has determined that the user is currently in a sad mood. If this situation, the playlist engine 128 may be configured to generate a playlist that includes songs predefined as likely to induce a happy mood. Alternatively, the playlist engine 128 may be configured to randomly change the genre of songs included in a playlist, and to determine whether the user's mood has changed in response.

In one embodiment, the playlist engine 128 may be configured to generate playlists based on the default playlists 125 included in storage 124. The default playlists 125 may be used by any user of the virtual world 130, and may be predefined to correspond to specific situations within the virtual world 130. For example, default playlists 125 may be specified according to the user's activity, profile, location, mood, speech (including text messages initiated by the user), etc. The playlist engine 128 may use a default playlist 125 as a starting point for generating a customized playlist for a given user and situation context. Further, the default playlists 125 may be used in situations where there is insufficient user-specific data to generate a playlist. Optionally, the playlist engine 128 may compare the user's mood to the default playlists 125. For example, if the music preferences 105 do not include any associations to the user's current mood, then the playlist engine 128 may instead use associations to moods specified in the default playlists 125 to generate a playlist.

In one embodiment, the playlist engine 128 may be configured to generate playlists based on topics discussed in the user's communications. That is, the client application 109 may be configured to determine a topic of conversation by searching for keywords or phrases included in the user's communications, and the playlist engine 128 may be configured to then generate a playlist including songs that are related to the determined topics. For example, in the event that the user is discussing a particular artist with another user within the virtual world 130, the playlist engine 128 may then generate a playlist that includes songs performed by the discussed artist. Thus, the user(s) may continue the conversation accompanied by a soundtrack of such songs.

The playlist engine 128 may be further configured to generate playlists based on changes in the user's activities. For example, in the event that the user is walking in the virtual world 130, and then begins to run, the playlist engine 128 may modify a playlist from quiet songs to songs having a faster tempo and/or higher energy level. Further, in the event of such changes to the types of songs included in a playlist, the playlist engine 128 may be configured to provide a smooth transition from the first type to the second type. For example, in order to ensure that a transition in a playlist is not excessively abrupt, the playlist engine 128 may include one or more transition songs to provide a smooth transition from slow songs to fast songs. The playlist engine 128 may be further configured to generate playlists for use during specific events or activities in the virtual world 130. For example, an organizer of a public event may specify particular songs or genres to be played to users participating in the event. In such a case, the playlist engine 128 may be configured to generate a playlist based on the specified songs or genres.

In one embodiment, the playlist engine 128 may be configured to evaluate the above-described factors alone or in combination, or by weighing each one in order of importance and/or user preference. Additionally, other situational characteristics may also be evaluated by the playlist engine 128, as may be suited to a particular application.

Of course, the embodiments described above are intended to be illustrative, and are not limiting of the invention. Other embodiments are broadly contemplated. For example, music preferences 105 may be stored on server 120, rather than on client computer 110. In another example, the client application 109 and/or the playlist engine 128 may be replaced by separate components, such as a component resident on either the client computer 110 or the server 120, a component configured to determine the user's mood, a component to generate playlists, etc.

Figure 3:
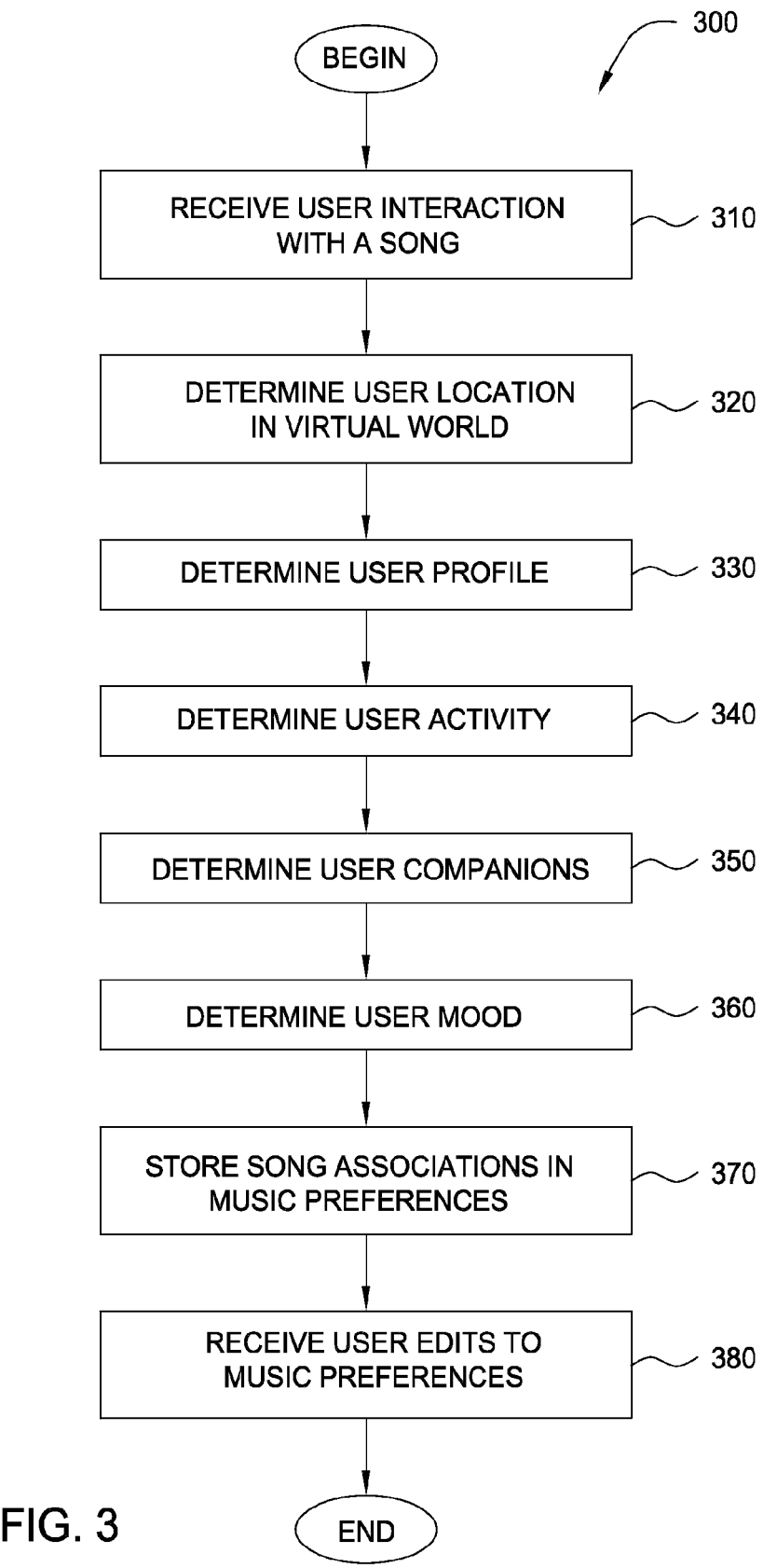
FIG. 3 is a flow diagram illustrating a method for generating music preferences of a user of a virtual world, according to one embodiment of the invention.

FIG. 3 is a flow diagram illustrating a method 300 for generating music preferences of a user of a virtual world, according to one embodiment of the invention. Specifically, the steps of method 300 may be assumed to be performed by the playlist engine 128 and/or the client application 109 illustrated in FIG. 1. However, persons skilled in the art will understand that any system configured to perform the steps of method 300, in any order, is within the scope of the present invention.

The method 300 begins at step 310, by receiving a user interaction with a song. The song may be played as part of the user's soundtrack of a virtual world (e.g., virtual world 130 illustrated in FIG. 1). The received interaction may include any actions that indicate a user preference for the song, such as selecting the song, skipping the song, changing the volume, and the like. At step 320, the user's location within the virtual world may be determined. In one embodiment, the user's location may be the virtual location of the user's avatar. For example, referring to the situation illustrated in FIG. 2, the current location of the user may be that of the user's avatar 260, namely a virtual town square. The user's location may be described using, e.g., the user's location coordinates, the user's position relative to known landmarks, etc.

At step 330, a user profile may be determined. The user profile may be selected by the user, and may indicate the user's current intended mode of interacting with the virtual world. For example, a user engaged in business activities may select an "At Work" profile. At step 340, the user's current activity in the virtual world may be determined. For example, the determined user activities may include walking, running, talking, playing, etc. At step 350, the user's companions may be determined. For example, the playlist engine 128 may be configured to identify other users of the virtual world 130 that are in the company of the current user (i.e., the user corresponding to the music preferences 105).

At step 360, the user's current mood may be determined. In one embodiment, the user's mood may be determined by searching for keywords or phrases in the user's communications that are predefined to indicate particular moods. For example, if the user writes "I am happy" in a text communication, the client application 109 may detect the word "happy," and determine that the user is in a happy mood. Alternatively, the user's mood may be determined by using other suitable techniques, such as measuring physical characteristics of the user, detecting user interactions, user commands to indicate mood, and the like.

At step 370, the data collected in step 310-360 may be stored as a user preference for a particular song. For example, the client application 109 may modify the music preferences 105 to store a record of the user interaction received at step 310, including an identifier for the song and a description of the nature of the interaction (i.e., whether the interaction was positive or negative). Further, the stored record may include the situational characteristics determined at steps 320-360 (i.e., the user's activity, profile, location, companions, and mood). That is, the music preferences 105 may store the user's preference for a song under particular circumstances occurring in the virtual world 130. At step 380, the music preferences may be modified by the user directly. For example, the client application 109 may be configured to provide the user with a GUI for manually specifying music preferences while in the virtual world 130. After step 380, the method 300 terminates.

In one embodiment, steps 310-380 may be performed by the playlist engine 128 and/or the client application 109 illustrated in FIG. 1. Of course, method 300 is provided for illustrative purposes only, and is not limiting of the invention. It is contemplated that the steps of method 300 may be modified to incorporate other data describing user interactions into the user index. Such modifications may be made to suit particular situations, and are thus contemplated to be in the scope of the invention.

Figure 4:
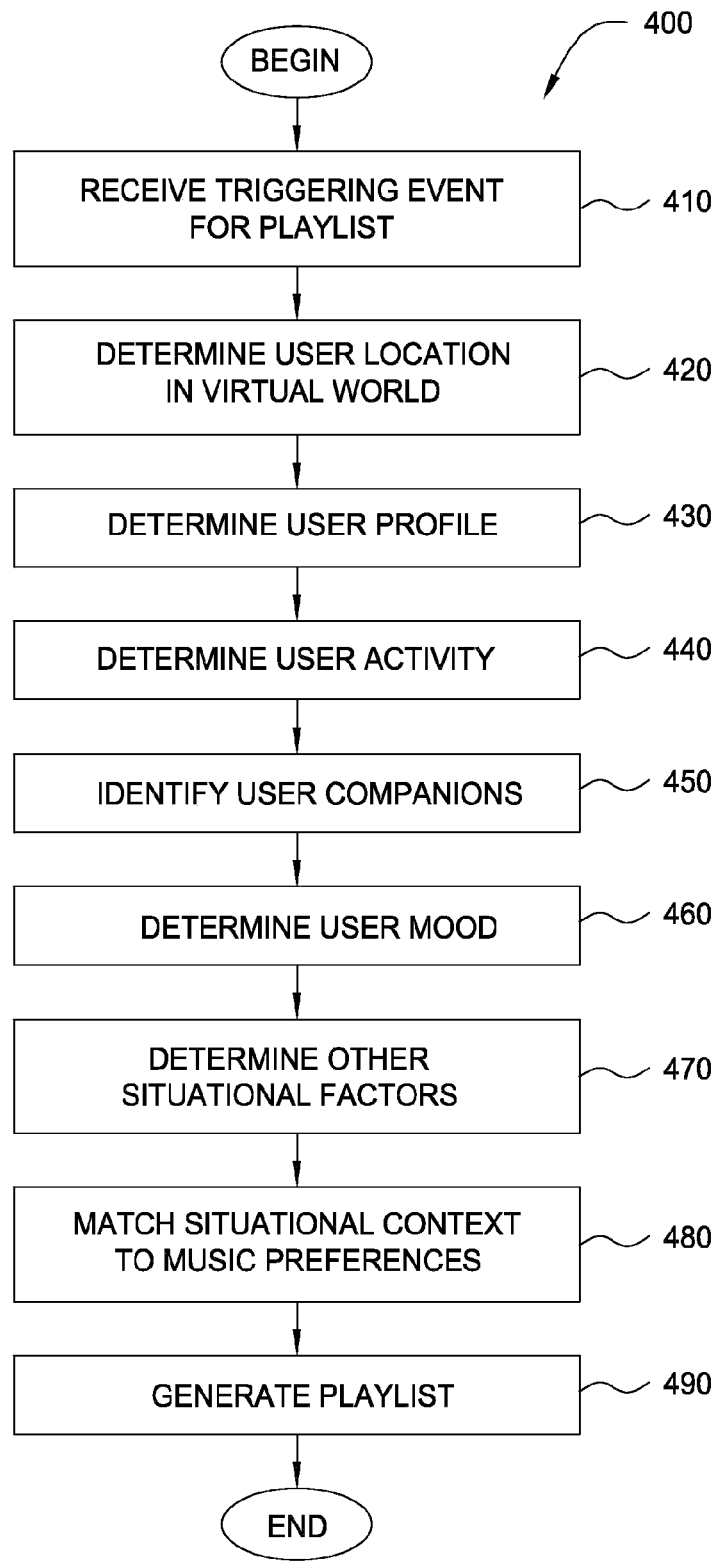
FIG. 4 is a flow diagram illustrating a method for generating playlists for users of a virtual world, according to one embodiment of the invention.

FIG. 4 is a flow diagram illustrating a method 400 for generating playlists for users of a virtual world, according to one embodiment of the invention. For the sake of illustration, method 400 is described in conjunction with the system of FIG. 1. Specifically, the steps of method 400 may be assumed to be performed by the suggestion engine 128 illustrated in FIG. 1. However, persons skilled in the art will understand that any system configured to perform the steps of method 400, in any order, is within the scope of the present invention.

The method 400 begins at step 410, where the virtual-world software detects a triggering event to provide a playlist to a user of a virtual world (e.g., virtual world 130). The triggering event may be an action or movement performed by the user. For example, assume the user joins a multi-player game taking place in the virtual world 130. In such a case, the action of joining the game may trigger the generation of a playlist suitable for listening by the user during the game. In another example, the triggering event may be a user request for a new playlist.

Generally, at steps 420-460, the user's current situational context may be determined. At step 420, the user's location may be determined. For example, the playlist engine 128 may determine the user's location within the virtual world 130. At step 430, the user's current profile may be determined. For example, the playlist engine 128 may determine that the user's profile is "Gaming," meaning the user is engaged in playing virtual games. At step 440, the user's current activity may be determined. For example, the determined user activities may include walking, running, talking, playing, etc. At step 450, the user's companions may be determined. For example, the playlist engine 128 may be configured to identify other users that are accompanying the current user in the virtual world 130. At step 460, the user's current mood may be determined. As described above, the user's mood may be determined using the techniques such as keyword analysis, measurement of physical characteristics of the user, analysis of user interactions, and the like. At step 470, other situational factors may be determined. For example, the playlist engine 128 may determine factors such as topics discussed in the user's communications, changes in the user's activities, the user's attendance at a virtual event having specified playlists, and the like.

At step 480, the user's current situational context may be matched to stored data describing the user's music preferences. In one embodiment, the data describing the user's music preferences may be generated by the method 300 described above, and may include associations of songs to particular situational factors such as location, profile, activity, companions, mood, and the like. For example, the playlist engine 128 may be configured to match the situational factors (determined at steps 420-470) to the music preferences 105 stored in the client storage 104. Each factor may be considered alone or in combination, or by weighing each one in order of importance and/or user preference. At step 490, a playlist may be generated. For example, the playlist engine 128 may generate a playlist from the songs specified in the music preferences 105 that best match the situational factors determined at steps 420-470. Optionally, the generated playlist may be composed based on musical properties specified in the music preferences 105, such as preferred genres, rhythms, tempos, lyrics, instruments, etc. Further, the playlist engine 128 may generate playlist that includes transition songs to minimize an abrupt transition from an earlier playlist. Furthermore, the playlist engine 128 may generate a playlist that includes a song intended to act as a mnemonic reminder of an earlier situation (e.g., an encounter with an acquaintance in the virtual world 130).

While the foregoing is directed to embodiments of the present invention, other and further embodiments of the invention may be devised without departing from the basic scope thereof, and the scope thereof is determined by the claims that follow.

What is claimed is:

1. A computer-implemented method of creating a user-specific playlist based on feedback received during playing of a song in a virtual environment, the method being implemented by a computer that includes one or more physical processors, the method comprising:
   receiving, by the computer, an instance of feedback about a song, from a user, during playing of the song in a virtual environment;
   determining, by the computer, a first situational context that corresponds to a first situation of an avatar of the user in the virtual environment at a time of receipt of the instance of feedback;
   populating, by the computer, a data structure with an entry for the instance of feedback, wherein the entry comprises, for the instance of feedback: (i) information identifying the song, and (ii) information corresponding to the first situational context;
   determining, by the computer, a second situational context that corresponds to a second situation of the avatar of the user in the virtual environment; and
   generating, by the computer, a playlist specific to the user in the virtual environment based on the instance of feedback responsive to a determination that the second situational context corresponds to the first situational context.

2. The computer-implemented method of claim 1, wherein the instance of feedback comprises at least one of a command to repeat the song, or a command to increase volume of the song.

3. The computer-implemented method of claim 1, wherein the instance of feedback comprises at least one of a command to skip the song, or a command to decrease volume of the song.

4. The computer-implemented method of claim 1, wherein the instance of feedback comprises a rating of the song.

5. The computer-implemented method of claim 1, wherein the information corresponding to the first situational context includes information about at least one of: (i) a location of the avatar of the user in the virtual environment, (ii) one or more interactions of the avatar of the user with one or more virtual objects in the virtual environment, or (iii) one or more avatar companions of the avatar of the user within the virtual environment.

6. The computer-implemented method of claim 1, wherein the information corresponding to the first situational context includes information about at least one of: (i) one or more topics included in a communication of the avatar of the user, (ii) one or more changes in activities of the avatar of the user, or (iii) participation in an event having a predefined list of songs.

7. The computer-implemented method of claim 1, wherein generating a playlist specific to the user in the virtual environment is further based on stored musical preferences of the user.

8. The computer-implemented method of claim 7, wherein the musical preferences include a history of songs played during past interactions of the avatar of the user with the virtual world.

9. The computer-implemented method of claim 7, wherein the musical preferences include one or more specified musical properties.

10. The computer-implemented method of claim 9, wherein the specified musical properties include at least one of song genres, song rhythms, song tempos, lyrics, or instruments.

11. A system for creating a user-specific playlist based on feedback received during playing of a song in a virtual environment, the system comprising:
    one or more computer processors;
    a memory containing a program which, when executed by the one or more computer processors, is configured to perform operations comprising:
    receiving an instance of feedback about a song, from a user, during playing of the song in a virtual environment;
    determining a first situational context that corresponds to a first situation of an avatar of the user in the virtual environment at a time of receipt of the instance of feedback;
    populating a data structure with an entry for the instance of feedback, wherein the entry comprises, for the instance: (i) information identifying the song, and (ii) information corresponding to the first situational context; and
    determining a second situational context that corresponds to a second situation of the avatar of the user in the virtual environment; and
    generating a playlist specific to the user in the virtual environment based on the instance of feedback responsive to a determination that the second situational context corresponds to the first situational context.

12. The system of claim 11, wherein the instance of feedback comprises at least one of a command to repeat the song, or a command to increase volume of the song.

13. The system of claim 11, wherein the instance of feedback comprises at least one of a command to skip the song, or a command to decrease volume of the song.

14. The system of claim 11, wherein the instance of feedback comprises a rating of the song.

15. The system of claim 11, wherein the information corresponding to the first situational context includes information about at least one of: (i) a location of the avatar of the user in the virtual environment, (ii) one or more interactions of the avatar of the user with one or more virtual objects in the virtual environment, or (iii) one or more avatar companions of the avatar of the user in the virtual environment.

16. The system of claim 11, wherein the information corresponding to the first situational context includes information about at least one of: (i) one or more topics included in a communication of the avatar of the user, (ii) one or more changes in the activities of the avatar of the user, or (iii) participation in an event having a predefined list of songs.

17. The system of claim 11, wherein generating a playlist specific to the user in the virtual environment is further based on stored musical preferences of the user.

18. The system of claim 17, wherein the musical preferences include a history of songs played during past interactions of the avatar of the user with the virtual world.

19. The system of claim 17, wherein the musical preferences include one or more specified musical properties.

20. The system of claim 19, wherein the specified musical properties include at least one of song genres, song rhythms, song tempos, lyrics, or instruments.

21. A computer program product to create a user-specific playlist based on feedback received during playing of a song in a virtual environment, the computer program product comprising:
a computer-readable storage memory device having computer-readable program code embodied therewith, the computer-readable program code comprising:
computer-readable program code for causing a processor to determine a first situational context that corresponds to an avatar of a user at a time of receipt, from the user, of an instance of feedback about a song during playing of the song in a virtual environment;
computer-readable program code for causing a processor to populate a data structure with an entry for the instance of feedback, wherein the entry comprises, for the instance of feedback: (i) information identifying the song, and (ii) information corresponding to the first situational context; and
computer-readable program code for causing a processor to determine a second situational context that corresponds to a second situation of the avatar of the user in the virtual environment; and computer-readable program code for causing a processor to generate a playlist specific to the user in the virtual environment based on the instance of feedback responsive to a determination that the second situational context corresponds to the first situational context.

* * * * *